(12) United States Patent
Berry et al.

(10) Patent No.: US 9,848,447 B2
(45) Date of Patent: Dec. 19, 2017

(54) METHOD AND SYSTEM FOR EMERGENCY NOTIFICATION

(75) Inventors: Joseph J. Berry, Northville, MI (US); Mark J. Scalf, Warren, MI (US); Douglas R. VanDagens, Beverly Hills, MI (US); Francis Luk, Ann Arbor, MI (US); Timothy Robert Nixon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1085 days.

(21) Appl. No.: 11/769,346

(22) Filed: Jun. 27, 2007

(65) Prior Publication Data

US 2009/0002145 A1 Jan. 1, 2009

(51) Int. Cl.
*B60Q 1/00* (2006.01)
*H04M 11/04* (2006.01)
(Continued)

(52) U.S. Cl.
CPC .......... *H04W 76/007* (2013.01); *G08G 1/205* (2013.01); *H04W 4/046* (2013.01); *H04W 4/22* (2013.01)

(58) Field of Classification Search
USPC .............. 340/539.13, 425.5–490; 455/404.1, 455/404.2, 557, 559
See application file for complete search history.

(56) References Cited

U.S. PATENT DOCUMENTS 4,442,485 A 4/1984 Ota et al.
4,833,477 A 5/1989 Tendler
(Continued)

FOREIGN PATENT DOCUMENTS

DE 102008060567 2/2010
EP 1507129 A1 2/2005
(Continued)

OTHER PUBLICATIONS

The Written Opinion of the International Searching Authority and International Search Report mailed Aug. 7, 2008 for PCT/US08/66878.
(Continued)

*Primary Examiner* — Curtis King
(74) *Attorney, Agent, or Firm* — Jennifer Stec; Brooks Kushman P.C.

(57) ABSTRACT

Method and apparatus for notifying an emergency responder of a vehicle emergency. Communication is established with a cellular telephone located within the vehicle. The communication link is monitored and the vehicle occupant is notified of link loss. The apparatus monitors vehicle safety systems for detection of an emergency condition. Upon detection, the occupant is notified that an emergency call will be made. If no cancellation is received, vehicle location information is obtained from a global position system, synthesized into voice signals, and communicated to an emergency responder using the cellular telephone. A plurality of occupant and vehicle emergency information may also be provided. Emergency responders may be provided with a touch tone menu to select among the available information. Vehicle and occupant information may be communicated to the apparatus from external sources, such as a web server database via cellular telephone connection, or removable memory.

15 Claims, 3 Drawing Sheets

(51) Int. Cl.
  *H04W 76/00* (2009.01)
  *G08G 1/00* (2006.01)
  *H04W 4/04* (2009.01)
  *H04W 4/22* (2009.01)

(56) References Cited

U.S. PATENT DOCUMENTS

| | | | |
|---|---|---|---|
| 4,937,796 A | 6/1990 | Tendler | |
| 5,144,323 A | 9/1992 | Yonkers | |
| 5,223,844 A | 6/1993 | Mansell et al. | |
| 5,388,147 A * | 2/1995 | Grimes | 455/404.2 |
| 5,515,043 A * | 5/1996 | Berard et al. | 340/988 |
| 5,555,286 A * | 9/1996 | Tendler | 455/404.2 |
| 5,598,460 A | 1/1997 | Tendler | |
| 5,649,059 A | 7/1997 | Tendler et al. | |
| 5,732,125 A | 3/1998 | Oyama | |
| 5,736,962 A | 4/1998 | Tendler | |
| 5,742,666 A | 4/1998 | Alpert | |
| 5,754,962 A * | 5/1998 | Griffin | 455/569.2 |
| 5,825,098 A | 10/1998 | Darby et al. | |
| 5,918,180 A | 6/1999 | Dimino | |
| 6,014,555 A | 1/2000 | Tendler | |
| 6,073,004 A | 6/2000 | Balachandran | |
| 6,151,385 A | 11/2000 | Reich et al. | |
| 6,266,617 B1 | 7/2001 | Evans | |
| 6,275,713 B1 * | 8/2001 | Toda | 455/564 |
| 6,292,551 B1 * | 9/2001 | Entman et al. | 379/221.04 |
| 6,427,072 B1 | 7/2002 | Reichelt | |
| 6,434,400 B1 * | 8/2002 | Villevieille et al. | 455/550.1 |
| 6,493,629 B1 * | 12/2002 | Van Bosch | 701/515 |
| 6,496,107 B1 | 12/2002 | Himmelstein | |
| 6,504,909 B1 | 1/2003 | Cook et al. | |
| 6,516,198 B1 | 2/2003 | Tendler | |
| 6,519,463 B2 | 2/2003 | Tendler | |
| 6,532,372 B1 * | 3/2003 | Hwang | 455/559 |
| 6,608,887 B1 | 8/2003 | Reksten et al. | |
| 6,633,754 B1 | 10/2003 | Raith | |
| 6,647,270 B1 | 11/2003 | Himmelstein | |
| 6,680,998 B1 | 1/2004 | Bell et al. | |
| 6,696,956 B1 | 2/2004 | Uchida et al. | |
| 6,757,528 B1 * | 6/2004 | Cardina et al. | 455/426.2 |
| 6,775,356 B2 | 8/2004 | Salvucci et al. | |
| 6,778,820 B2 | 8/2004 | Tendler | |
| 6,952,155 B2 | 10/2005 | Himmelstein | |
| 7,027,842 B2 | 4/2006 | Zhang et al. | |
| 7,034,238 B2 | 4/2006 | Uleski et al. | |
| 7,050,818 B2 | 5/2006 | Tendler | |
| 7,092,723 B2 | 8/2006 | Himmelstein | |
| 7,113,091 B2 | 9/2006 | Script et al. | |
| 7,119,669 B2 | 10/2006 | Lundsgaard et al. | |
| 7,123,926 B2 | 10/2006 | Himmelstein | |
| 7,139,549 B2 | 11/2006 | Islam et al. | |
| 7,164,921 B2 | 1/2007 | Owens et al. | |
| 7,228,145 B2 * | 6/2007 | Burritt et al. | 455/519 |
| 7,305,243 B1 | 12/2007 | Tendler | |
| 7,400,886 B2 * | 7/2008 | Sahim et al. | 455/444 |
| 7,447,508 B1 | 11/2008 | Tendler | |
| 7,450,955 B2 | 11/2008 | Himmelstein | |
| 7,463,896 B2 | 12/2008 | Himmelstein | |
| 7,479,900 B2 | 1/2009 | Horstemeyer | |
| 7,482,952 B2 | 1/2009 | Horstemeyer | |
| 7,505,772 B2 | 3/2009 | Himmelstein | |
| 7,536,189 B2 | 5/2009 | Himmelstein | |
| 7,548,158 B2 * | 6/2009 | Titus et al. | 340/539.13 |
| 7,574,195 B2 * | 8/2009 | Krasner et al. | 455/404.2 |
| 7,580,697 B2 | 8/2009 | Lappe et al. | |
| 7,580,782 B2 * | 8/2009 | Breed et al. | 701/45 |
| 7,596,391 B2 | 9/2009 | Himmelstein | |
| 7,599,715 B2 | 10/2009 | Himmelstein | |
| 7,626,490 B2 | 12/2009 | Kashima | |
| 7,706,796 B2 | 4/2010 | Rimoni et al. | |
| 7,747,291 B2 | 6/2010 | Himmelstein | |
| 7,783,304 B2 | 8/2010 | Himmelstein | |
| 7,825,901 B2 | 11/2010 | Potera | |
| 7,844,282 B1 | 11/2010 | Tendler | |
| 7,873,374 B1 | 1/2011 | O'Neil | |
| 7,885,685 B2 | 2/2011 | Himmelstein | |
| 7,894,592 B2 | 2/2011 | Book et al. | |
| 7,902,960 B2 | 3/2011 | Tsuchimochi et al. | |
| 7,907,976 B2 | 3/2011 | Himmelstein | |
| 7,957,772 B2 | 6/2011 | Charlier et al. | |
| 8,036,634 B2 | 10/2011 | DiMeo et al. | |
| 8,060,117 B1 | 11/2011 | Tendler | |
| 8,224,346 B2 | 6/2012 | Himmelstein | |
| 8,396,447 B2 | 3/2013 | Reich et al. | |
| 2001/0044302 A1 | 11/2001 | Okuyama | |
| 2002/0086718 A1 | 7/2002 | Bigwood et al. | |
| 2002/0115423 A1 * | 8/2002 | Hatae et al. | 455/404 |
| 2003/0139179 A1 * | 7/2003 | Fuchs et al. | 455/426 |
| 2003/0227381 A1 | 12/2003 | Best, Jr. | |
| 2003/0231550 A1 | 12/2003 | MacFarlane | |
| 2004/0162064 A1 | 8/2004 | Himmelstein | |
| 2004/0183671 A1 | 9/2004 | Long | |
| 2004/0198366 A1 * | 10/2004 | Crocker et al. | 455/452.1 |
| 2005/0037730 A1 | 2/2005 | Montague | |
| 2005/0048948 A1 | 3/2005 | Holland et al. | |
| 2005/0099275 A1 | 5/2005 | Kamdar et al. | |
| 2005/0119030 A1 | 6/2005 | Bauchot et al. | |
| 2005/0197174 A1 | 9/2005 | Hasan et al. | |
| 2005/0222933 A1 | 10/2005 | Wesby | |
| 2005/0275505 A1 | 12/2005 | Himmelstein | |
| 2006/0049922 A1 | 3/2006 | Kolpasky et al. | |
| 2006/0061483 A1 | 3/2006 | Smith et al. | |
| 2006/0071804 A1 | 4/2006 | Yoshioka | |
| 2006/0165015 A1 | 7/2006 | Melick et al. | |
| 2006/0217105 A1 * | 9/2006 | Kumar P S et al. | 455/404.1 |
| 2006/0224305 A1 | 10/2006 | Ansari et al. | |
| 2006/0262103 A1 | 11/2006 | Hu et al. | |
| 2006/0288053 A1 | 12/2006 | Holt et al. | |
| 2007/0050248 A1 | 3/2007 | Huang et al. | |
| 2007/0053513 A1 | 3/2007 | Hoffberg | |
| 2007/0106897 A1 | 5/2007 | Kulakowski | |
| 2007/0142028 A1 | 6/2007 | Ayoub et al. | |
| 2007/0167147 A1 | 7/2007 | Krasner et al. | |
| 2007/0171854 A1 * | 7/2007 | Chen et al. | 370/328 |
| 2007/0203643 A1 | 8/2007 | Ramaswamy et al. | |
| 2007/0218923 A1 | 9/2007 | Park et al. | |
| 2007/0243853 A1 | 10/2007 | Bumiller et al. | |
| 2007/0264990 A1 | 11/2007 | Droste et al. | |
| 2007/0281603 A1 | 12/2007 | Nath et al. | |
| 2008/0039018 A1 | 2/2008 | Kim | |
| 2008/0080687 A1 | 4/2008 | Broms | |
| 2008/0139118 A1 | 6/2008 | Sanguinetti | |
| 2008/0140665 A1 | 6/2008 | Ariel et al. | |
| 2008/0143497 A1 | 6/2008 | Wasson et al. | |
| 2008/0150683 A1 | 6/2008 | Mikan et al. | |
| 2008/0177541 A1 | 7/2008 | Satomura | |
| 2008/0180237 A1 | 7/2008 | Fayyad et al. | |
| 2008/0208446 A1 | 8/2008 | Geelen et al. | |
| 2008/0243545 A1 | 10/2008 | D'Ambrosia et al. | |
| 2008/0252444 A1 * | 10/2008 | Batot et al. | 340/539.13 |
| 2008/0285727 A1 | 11/2008 | Burgess | |
| 2009/0002145 A1 | 1/2009 | Berry et al. | |
| 2009/0099732 A1 | 4/2009 | Pisz | |
| 2009/0149153 A1 | 6/2009 | Lee | |
| 2009/0160607 A1 | 6/2009 | Edwards et al. | |
| 2009/0161836 A1 | 6/2009 | Oesterling | |
| 2009/0164053 A1 | 6/2009 | Oesterling | |
| 2009/0186596 A1 | 7/2009 | Kaltsukis | |
| 2009/0187300 A1 | 7/2009 | Everitt et al. | |
| 2009/0207007 A1 | 8/2009 | Flick et al. | |
| 2009/0253403 A1 | 10/2009 | Edge et al. | |
| 2009/0261958 A1 | 10/2009 | Sundararajan et al. | |
| 2009/0286504 A1 | 11/2009 | Krasner et al. | |
| 2010/0035598 A1 | 2/2010 | Lee et al. | |
| 2010/0048160 A1 | 2/2010 | Lekutai | |
| 2010/0058333 A1 | 3/2010 | Peterson | |
| 2010/0069018 A1 | 3/2010 | Simmons et al. | |
| 2010/0076764 A1 | 3/2010 | Chengalvarayan | |
| 2010/0097239 A1 | 4/2010 | Campbell et al. | |
| 2010/0190479 A1 | 7/2010 | Scott et al. | |
| 2010/0202368 A1 | 8/2010 | Hans | |
| 2010/0210211 A1 | 8/2010 | Price | |
| 2010/0227582 A1 | 9/2010 | Berry et al. | |

(56) References Cited

U.S. PATENT DOCUMENTS

| | | |
|---|---|---|
| 2010/0227584 A1 | 9/2010 | Hong |
| 2010/0240337 A1 | 9/2010 | Dimeo et al. |
| 2010/0253535 A1 | 10/2010 | Thomas et al. |
| 2010/0273466 A1 | 10/2010 | Robertson et al. |
| 2010/0323657 A1 | 12/2010 | Barnard et al. |
| 2010/0323660 A1 | 12/2010 | Himmelstein |
| 2010/0330972 A1 | 12/2010 | Angiolillo |
| 2011/0003578 A1 | 1/2011 | Chen et al. |
| 2011/0028118 A1 | 2/2011 | Thomas |
| 2011/0059720 A1 | 3/2011 | Penix et al. |
| 2011/0071880 A1 | 3/2011 | Spector |
| 2011/0093154 A1 | 4/2011 | Moinzadeh et al. |
| 2011/0098016 A1 | 4/2011 | Hatton |
| 2011/0201302 A1 | 8/2011 | Hatton |
| 2011/0202233 A1 | 8/2011 | Hatton |
| 2011/0225228 A1 | 9/2011 | Westra et al. |
| 2011/0230159 A1 | 9/2011 | Hatton |
| 2011/0275321 A1 | 11/2011 | Zhou et al. |
| 2012/0028599 A1 | 2/2012 | Hatton et al. |
| 2012/0053782 A1 | 3/2012 | Gwozdek et al. |
| 2012/0264395 A1 | 10/2012 | Bradburn et al. |
| 2012/0281605 A1 | 11/2012 | Himmelstein |

FOREIGN PATENT DOCUMENTS

| | | |
|---|---|---|
| EP | 2037664 | 3/2009 |
| EP | 2093982 A1 | 8/2009 |
| EP | 2219163A1 A1 | 8/2010 |
| JP | 2001043472 A | 2/2001 |
| JP | 2003-022490 * | 1/2003 |
| JP | 2003022490 A | 1/2003 |
| JP | 2006005744 A | 1/2006 |
| JP | 2006270564 A | 10/2006 |
| WO | WO2008011432 A2 | 1/2008 |

OTHER PUBLICATIONS

Wikipedia, "e-Call" project of the European Commission web page (e-Call—Wikipedia, the free encyclopedia).
"eCall Toolbox" web page (SafetySupport, 2005).
Ford Motor Company, "Navigation System: SYNC," Owner's Guide Supplement, SYNC Version 1 (Jul. 2007).
Ford Motor Company, "SYNC," Owner's Guide Supplement, SYNC Version 1 (Nov. 2007).
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
Wayne Thalls, "Santa Cruz Ares Handbook", Santa Cruz Ares 1990, pp. 1-29.
EPO Search Report; 11153638.9-1525; mailed May 27, 2011.
Joseph J. Berry, et al., U.S. Appl. No. 11/769,346, filed Jun. 27, 2007, Method and System for Emergency Notification.
Joseph J. Berry, et al., U.S. Appl. No. 12/399,513, filed Mar. 6, 2009, Method and System for Emergency Call Handling.
Patent Application "Method and System for Emergency Notification".
Patent Application "Method and System for Emergency Call Handling".
PCT Search Report; PCT App. PCT/US10/027451; Mailed May 20, 2010.
Kermit Whitfield, "A hitchhiker's guide to the telematics ecosystem", Automotive Design & Production, Oct. 2003, http://findarticles.com, pp. 1-3.
EPO Extended Search Report; 11009966.0-2413; dated May 24, 2012.
EPO Search Report; 11154014.2-2414; dated May 31, 2011;.
European MoU for Realisation of Interoperable in-Vehicle eCall; May 28, 2004; 7 Pages.
Office Action, Non-Final Rejection, dated Apr. 22, 2013.
Intellectual Property Office Examination Report; GB1117765.6; dated Aug. 22, 2013; 2 pages.

* cited by examiner

METHOD AND SYSTEM FOR EMERGENCY NOTIFICATION

BACKGROUND OF THE INVENTION

1. Field of the Invention

Embodiments of the present invention generally relate to a method and system for notifying emergency responders in the event of an automobile accident or other emergency.

2. Background Art

ONSTAR offers a SAFE & SOUND program in which a human "Advisor" fields emergency calls from ONSTAR-equipped vehicles. Calls are manually initiated at the vehicle either by depressing an emergency button located within the passenger compartment (e.g. below the rear-view mirror), or automatically initiated upon deployment of an air bag in the event of a collision. Collisions may be detected using one or more accelerometers or other impact detecting devices mounted within the vehicle, as is well known in the art.

An emergency call from an ONSTAR-equipped vehicle to the Advisor switchboard indicates the geographic location of the vehicle, and places the Advisor in voice communication with the passenger compartment. The Advisor attempts to communicate with the occupant(s) of the vehicle to determine the severity and circumstances of the incident giving rise to the emergency call. If the Advisor determines that emergency attention is necessary, either because of the occupant response(s), or because there was no response indicating that the occupant(s) may be ejected and/or severely injured, the Advisor dispatches emergency responders closest to the reported location of the vehicle.

U.S. Pat. No. 7,119,669 titled "Method And Apparatus For Detecting Vehicular Collisions" describes a cellular telephone that is equipped with technology for detecting a vehicular collision. This system is portable and operates independently, without the need of embedded vehicular subsystems, such as an accelerometer to detect collisions or a global positioning system to detect vehicle velocity and location. These subsystems are embedded into the cellular telephone described in the '669 patent. The '699 patent describes communicating electronic data, such as the magnitude, time and location of the collision to authorities in the even a collision is detected. The '699 patent also describes playing prerecorded messages about the device's owner, including medical information. The '699 patent describes various software "filters" for screening out "false positives" or "false collision detections" to avoid unnecessarily contacting emergency responders in non-emergency situations, such as when the cellular telephone is accidently dropped.

U.S. Pat. No. 5,918,180 titled "Telephone Operable Global Tracking System For Vehicles" describes a system for tracking vehicles using a cellular telephone and global positioning system that is located in the vehicle. The system also includes a speech synthesizer circuit that converts the digitally-encoded coordinates into speech for enunciating the vehicle location through the cellular telephone. By calling the cellular telephone from a remote location, the owner of the vehicle can determine its location. The '180 patent also describes using the system to call the police.

U.S. Pat. No. 5,555,286 titled "Cellular Phone Based Automatic Emergency Vessel/Vehicle Location System" describes a navigation unit that receives GPS data, and upon receipt of an activation event such as an airbag deployment, causes DTMF tones to be generated in a cellular telephone for dialing an emergency responder. The geographic location information and the identity of the vehicle are synthesized into voice and are then communicated to the emergency responder using the cellular telephone connection.

SUMMARY OF THE INVENTION

An objective of one or more embodiments of the present invention is to provide an improved emergency notification system that can promptly communicate emergency information to emergency responders in the event of an automobile accident or other emergency.

Embodiments of the present invention enable users to customize the information that is presented to responders in the event of an emergency. For example, a user may access a database or other data storage device associated with the invention to define or otherwise customize information to be presented to the emergency responders in the event of an emergency call, such as name, address, blood type, medical allergies, doctor contact information, relatives, etc.

Embodiments of the present invention enable emergency responders receiving an emergency call to select among a variety of available information that may be useful in responding to an emergency. Responders may be provided with a voice-synthesized menu to repeat and/or select among the available information using DTMF tones. In this fashion, the most urgent information, such as vehicle location, number of persons, etc. may be reported/received first, but other important information can be subsequently obtained at the responders' discretion. Another embodiment of the invention provides the responders with online access to driver/passenger emergency information.

Another objective of one or more embodiments of the present invention is to prevent unnecessary notification of emergency responders in non-emergency situations. Upon detection of an emergency situation within the vehicle, such as an airbag deployment, one or more audible messages are played asking the occupant(s) to press a cancel button if the emergency call is to be cancelled. If the button is not pressed within a predetermined amount of time, the emergency call may be initiated.

Another objective of one or more embodiments of the present invention is to maintain continuous connectivity between the vehicle emergency response module and at least one cellular telephone within the vehicle. Appropriate notifications and status indicators may be provided to inform vehicle occupants that connectivity is established, or broken.

Embodiments of the present invention include a process and apparatus for notifying an emergency responder of a vehicle emergency. A first communication link, such as a BLUETOOTH link, is established with a first cellular telephone located within the vehicle. A connection status for the first communication link is monitored, and an indication to a vehicle occupant is generated if the first communication link is lost. The process monitors for receipt of an emergency signal indicating an emergency condition associated with the vehicle. If an emergency signal is received, a location for the vehicle is retrieved from a global positioning system. An indication is made to the occupant of the vehicle that a cellular telephone call to an emergency responder is going to be made to report the emergency and vehicle location. The occupant's response, if any, is monitored. If cancellation is not received, the cellular telephone is activated to dial a telephone number of an emergency responder. Data representing the emergency and location of the vehicle are processed into speech signals, and are communicated to the emergency responder over the first communication link.

Another embodiment of the present invention includes storing a plurality of occupant or vehicle information in a data storage device, and presenting the emergency responder with voice menu options for selecting one or more items of the plurality of occupant or vehicle information.

Another embodiment of the present invention enables the communication of one or more items of occupant or vehicle information to a Web server via the Internet, and then to the associated data storage device using a cellular telephone within the vehicle. Items of occupant or vehicle information may also be downloaded to the associated data storage device, or stored in a removable memory device interfaced to the data processor.

According to another embodiment of the present invention, the emergency responder is provided with a touch tone menu to select among the plurality of occupant and vehicle information.

Another embodiment of the present invention establishes a second communication link with a second cellular telephone within the vehicle if the first communication link with the first cellular telephone is lost.

Yet another embodiment of the present invention activates the cellular telephone to dial a telephone number of a predefined contact other than an emergency responder, and communicate the speech signals to the predefined contact.

These objectives and embodiments of the present invention are not exclusive. Other objectives and embodiments of the present invention are detailed in the following detailed description of the preferred embodiments, the accompanying figures and claims.

These figures are not exclusive representations of the systems and processes that may be implemented to carry out the inventions recited in the appended claims. Those of skill in the art will recognize that the illustrated system and process embodiments may be modified or otherwise adapted to meet a claimed implementation of the present invention, or equivalents thereof.

DETAILED DESCRIPTION OF THE PREFERRED EMBODIMENT(S)

Figure 1:
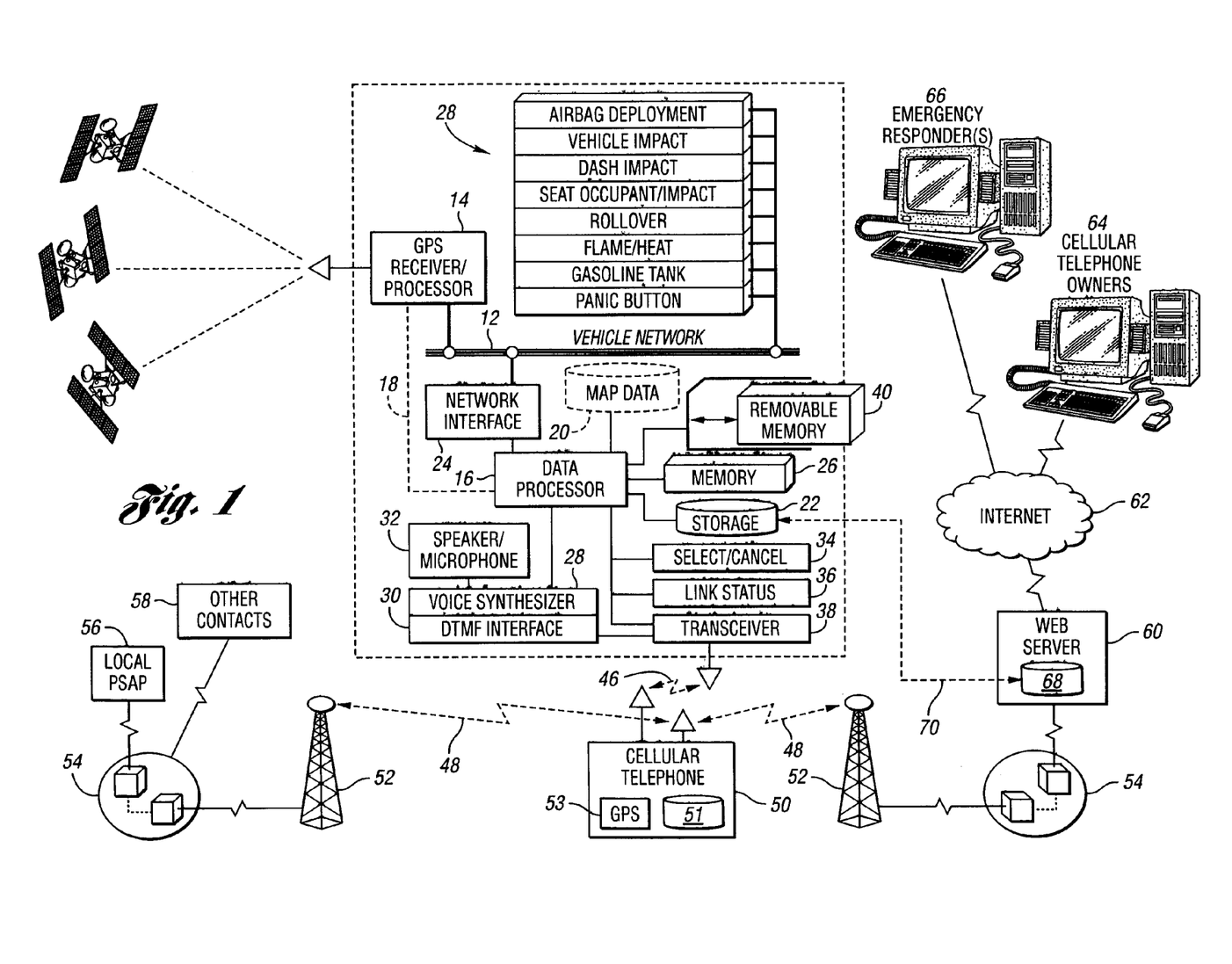
FIG. 1 is a system diagram illustrating aspects of physical embodiments of the present invention.

FIG. 1 illustrates a physical system architecture which may be implemented to practice one or more aspects of the present invention. Block 10 generally comprises vehicle sub-systems, some of which may be interconnected by a vehicle network 12 such as a Controller Area Network or other suitable communication network.

Data processor 16 may receive and send information across vehicle network 12 through an appropriate network interface or bus adapter 24. Data processor 16 may be a traditional RISC or CISC processor in bus communication with general purpose volatile memory 26, and general purpose non-volatile or persistent storage 22, such as magnetic or flash memory, as is well known in the art. Removable memory 40 may also be provided, such as a compact flash card or a flash memory module having a Universal Serial Bus (USB) interface (not shown).

A global positioning signal receiver/processor 14 may be implemented to receive radio signals (e.g. the L1 frequency of 1575.42 MHz in the UHF band) from multiple satellites of the Navigation Signal Timing and Ranging (NAVSTAR) Global Positioning System. These signals may include a pseudorandom code identifying the transmitting satellite, ephemeris data and almanac data. The global positioning signal receiver/processor 14 may process this data to determine the two-dimensional location (e.g. latitude and longitude), the three-dimensional location (e.g. latitude, longitude and altitude), the velocity and/or the direction of the vehicle. Location, velocity and/or direction information calculated at the global positioning signal receiver/processor 14 may be communicated across vehicle network 12, and/or directly to data processor 16 via link 18.

Alternatively, a global positioning signal receiver/processor 53 may be a subsystem of cellular telephone 50. Information representing the global position of the cellular telephone, and thus the vehicle in which the cellular telephone is located, may be retrieved by data processor 16 via transceiver 38 and communication link 46.

The vehicle sub-systems may include a map database 20. Database 20, like general storage 22, may take several forms including but no limited to magnetic storage (e.g. a hard drive), optical storage (e.g. CD-ROM, DVD), flash memory, etc. Data processor 16 may determine a present street location and heading of the vehicle based on latitude, longitude and direction data received from GPS receiver/processor, and map data retrieved from database 20, as is well known in the art.

A plurality of emergency condition sensors 28 may be interfaced to vehicle network 28. Such sensors may include but are not limited to air bag deployment sensors, vehicle impact sensors, dash impact sensors, seat/occupant impact sensors, rollover sensors, flame/heat sensors, gasoline sensors and an occupant-activated panic button. These sensors may operate within individual processing modules (not shown), each having a separate interface (not shown) to the vehicle network 12 for sending signals indicating a plurality of different emergency conditions.

Another subsystem in communication with data processor 16 includes a voice synthesizer or decoder 28 for converting digital information received from the data processor 16 into audible speech signals, i.e. analog sound signals. The analog sound signals may be communicated through speaker 32, or processed at transceiver 38, for communication to cellular telephone 50 transceiver (not shown) across piconet 46 as discussed in greater detail below. A dual tone multifrequency (DTMF) interface 30 may be provided for receiving analog DTMF frequencies and processing them as command signals to data processor 16, as is well known in the art of automated telephone menu systems.

Transceiver 38 may establish a piconet 46 with cellular telephone 50 or other available device. Cellular telephone 50 is an example of a transient cellular communication device that is not permanently integrated into the vehicle. Another example of a transient cellular communication device may be a laptop computer having cellular communication and piconet communication capabilities.

In one example, transceiver 38 may comprise a BLUETOOTH controller. Those of skill in the art will recognize that other transceivers may be used having different communication characteristics and performance.

Figure 2:
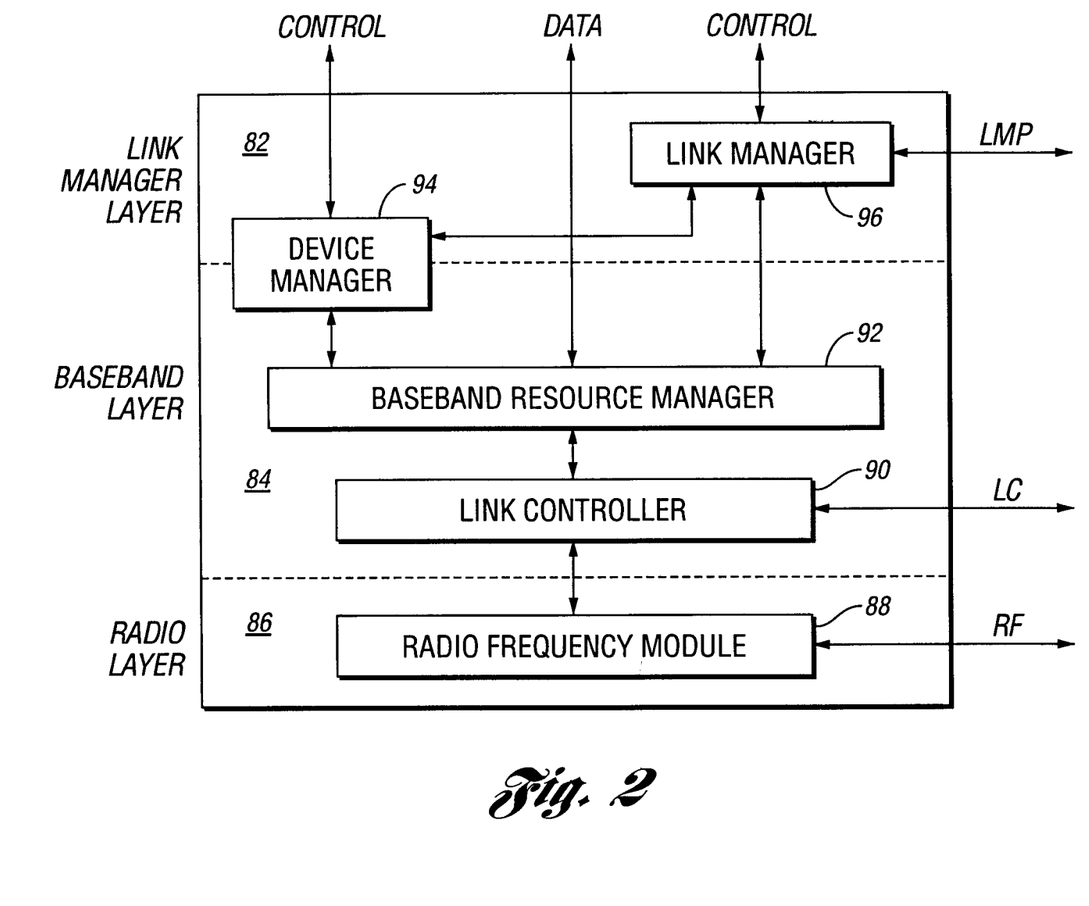
FIG. 2 is a block diagram of a BLUETOOTH controller which may be implemented to support aspects and embodiments of the present invention.

As illustrated in FIG. 2, a BLUETOOTH controller may include a link manager layer 82, a baseband layer 84 and a radio layer 86. The radio layer 86 may include a radio frequency module operating at 2.4 GHz using binary frequency modulation.

Baseband layer 84 may include a baseband resource manager 92 for managing the exchange of data between connected devices over logical links and logical transports, as well as the use of the radio medium to carry out inquiries, make connections, or be discoverable.

Baseband layer 84 may also include a link controller 90 which handles encoding and decoding of BLUETOOTH packets from the data payload and parameters related to the physical channel, logical transport and logical link. The link controller 90 carries out the link control protocol signaling which is used to communicate flow control and acknowledgment and retransmission request signals.

Device manager 94 controls the general behavior of the BLUETOOTH enabled device. It is responsible for operation of the BLUTOOTH system that is not directly related to data transport, such as inquiring for the presence of other nearby devices, connecting to other devices or making the local device discoverable or connectable by other devices.

The link manager layer 82 may include a link manager 96 for managing the creation, modification, and release of logical links and/or logical transports, as well as the update of parameters related to physical links between devices. The link manager may achieve this by communicating with the link manager in remote BLUETOOTH devices using the link management protocol (LMP). The LMP allows the creation of new logical links and logical transports between devices when required, as well as the general control of link and transport attributes such as the enabling of encryption on the logical transport, the adapting of transmit power on the physical link or the adjustment of QoS settings for a logical link.

Other vehicle subsystems 10 include a link status indicator 36 for notifying vehicle occupants of the status of the communication link between transceiver 38 and cellular telephone 50. Statuses include but are not limited to available devices, paired, unpaired, connected, not connected, etc. In one embodiment, the status of the communication link is indicated on a liquid crystal display (LCD). In another embodiment, one or more light emitting diodes (LEDs) or other visual indicators are provided. In yet another embodiment, audible status notifications are provided through the vehicle sound system and/or speaker 32. Link status may be monitored by data processor 16 in conjunction with transceiver 38.

A select/cancel switch 34 may also interface with data processor 16 for push-button control over microprocessor/system functions as described in greater detail below. Select/cancel switch 34 may be a soft switch operating in conjunction with a LCD display, or a software switch operated by voice command received at microphone 32 and processed by voice synthesizer 28 and/or microprocessor 16.

A wide variety of different interconnections among subsystems 10 and external communication networks may be practiced within the scope of the present invention, beyond those illustrated in FIG. 1. For example, a hard wire connection may be established between cellular telephone 50 and data processor 16, voice synthesizer 28, and/or DTMF interface 30. In another example, data processor 16 may be connected directly or indirectly to emergency sensor modules 28, and may monitor the ports to which the emergency sensor modules are attached instead of vehicle network 12.

In one embodiment of the present invention, cellular telephone 50 establishes wireless communication 48 with terrestrial tower 52. Terrestrial tower 52 in turn established communication through telephone switching network 54 with emergency responder(s) 56. Emergency responders may include police, ambulance a 911 public safety access point (PSAP), etc. as described in greater detail below. Terrestrial tower 52 may also establish communication through telephone switching network 54 with other contacts 58, as described in greater detail below.

In another embodiment of the present invention, terrestrial tower 52 may establish communication through telephone switching network 54 with a data interface (not shown) at web server 60. As described in greater detail below, data may be uploaded and downloaded communicated from associated database 68 to/from storage 22 associated with microprocessor 16, as illustrated by dashed line 70.

Figure 3:
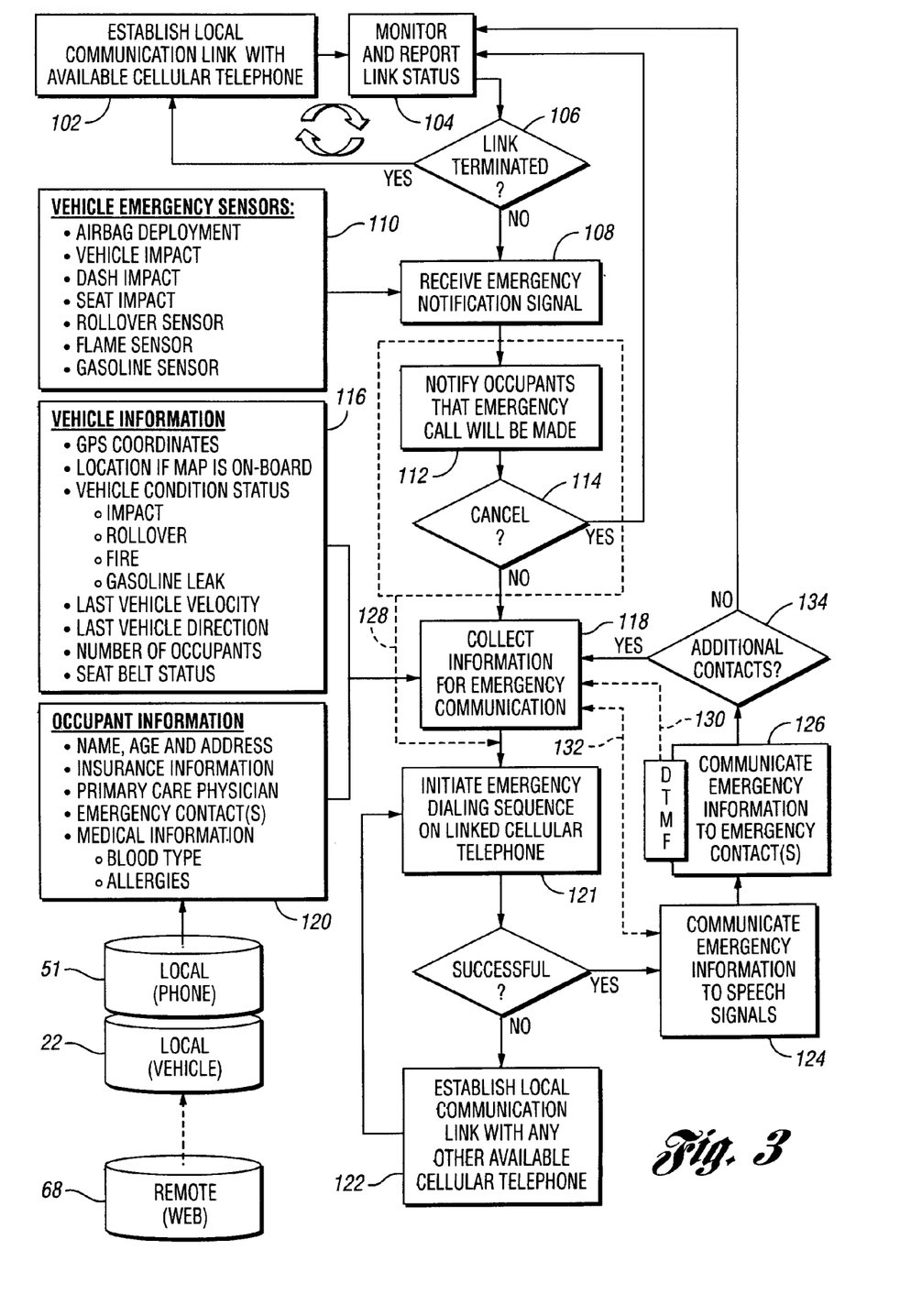
FIG. 3 is a flow diagram illustrating a process for implementing embodiments of the present invention.

Web server 60 having associated storage 68 may host a plurality of web pages for Internet access 62 by a plurality of browsers, including but not limited to emergency responder(s) 66, cellular telephone owner(s) 64, healthcare providers, etc. As described in greater detail below, some browsers, such as cellular telephone owners 64 may upload data over Internet 62 to storage 68, and other browsers, such as emergency responders 66 may download data FIG. 3 illustrates an example algorithm 100 for implementing an embodiment of the present invention. Those of skill in the art will recognize that the scope of the present invention is not limited to the specific algorithm illustrated in FIG. 3. The illustrated process may modified to fit a particular implementation of the present invention. The processes illustrated in FIG. 3 may be implemented by one or more processors, such as data processor 16 illustrated in FIG. 1. No particular type of processor or configuration is required.

At step 102, a local communication link may be established with an available cellular telephone in or nearby the vehicle passenger compartment. The link may be a BLUETOOTH piconet, or other suitable short-range network, wired or wireless. At steps 104 and 106, the status of the communication link may monitored on a continuous or basis, or at regular intervals. The status of the link may include the connectivity of the paired cellular telephone, the signal strength, the identity of other available devices, etc. s described with respect to FIG. 1, link status may be reported by LCD display, LED, or audibly. Preferably, a warning or other notification is provided to passengers within the vehicle compartment when a link is disrupted, or when no link is available.

At step 108, an emergency notification signal is received from vehicle emergency sensors 110. Vehicle emergency sensors 110 may include but are not limited to air bag deployment sensors, vehicle impact sensors, dash impact sensors, seat impact sensors, rollover sensors, flame sensors, gasoline sensors, etc. Emergency signals from these sensors may be received at data processor 16 directly by wire, wirelessly, or over vehicle network 12.

Upon receipt of an emergency notification signal, the system may notify occupants of the vehicle, at step 112, that an emergency call to one or more emergency responders 56 or other contacts 58 is going to be made at cellular telephone 50. Occupant notification is preferably done audibly using voice synthesizer 28 and speaker 32 which may or may not be a component of the vehicle sound system. The following is an example notification:

"Warning. A safety sensor in this vehicle has detected a vehicle collision. The vehicle safety system will automatically contact emergency responders in 10 seconds. Press your cancel button or say CANCEL if you want to terminate this call."

Of course, an unlimited number of different notifications may be provided. They may be pre-recorded, pre-defined, or dynamically created based on the particular emergency detected and/or the particular occupant(s) within the vehicle. Preferably, the notification is repeated. At step 114, the vehicle occupants are provided with an opportunity to cancel the emergency call using the select/cancel switch 22 or a voice command received at microphone 32 and voice synthesizer 28. If a cancellation signal is received, the process stops, and returns to monitoring link status at block 104.

If the emergency call is not terminated at 114, emergency information is collected at step 118. Emergency information may include vehicle information 116 and occupant information 120. Vehicle information 116 may include latitude, longitude, direction, last velocity, etc from GPS receiver/ processor 14, street location if the vehicle is equipped with map data 20, vehicle type/color, vehicle emergency condition (e.g., impact, fire, rollover, fire, gasoline leak, etc.), number of occupants, seat belt status, etc. Occupant information 120 may include name, age, address, blood type, medical allergies, medical condition, insurance information, physician information, emergency contact(s), etc. Emergency information may be stored in a plurality of storage locations including memory 26, storage 22, removable memory 40, or storage 51 associated with cellular telephone 50.

Occupant identification may be determined by the owner of the cellular telephone 50 paired with transceiver 38, voice input at microphone 32, user input at a vehicle console display (not shown), or other means including key identifier, memory key identifier, etc.

After emergency information is collected at step 118, another occupant notification may be made warning the occupant(s) that an emergency call is going to be made, and providing the occupant(s) with an opportunity to cancel the call, as described above with respect to steps 112 and 114. This step is represented by dashed lines 128.

If the emergency call is not canceled, transceiver 38 such as a BLUETOOTH controller may initiate a call on cellular telephone 50 to one or more emergency responders 56 or other contacts 58 at step 121. If a call cannot be initiated, the system attempts to establish connection with another cellular telephone in or nearby the vehicle as represented at block 122, and communicate the emergency information as represented at block 121.

At step 124, elements of vehicle information 116 and/or occupant information 120 may be synthesized into speech signals at voice synthesizer 28 and read to the terminating party 56 or 58 as indicated at block 126. In one embodiment of the present invention, the data processor 16 and the voice synthesizer 28 provide the terminating party 56 or 58 with touch tone DTMF menu options for repeating and retrieving the various elements of vehicle information 116 and/or occupant information 120. This process is illustrated with dashed lines 130 and 132.

If the occupant(s) have identified additional contacts 58 for reporting emergency information, those entities are contacted, and emergency information is reported, as represented by step 134.

As illustrated in FIG. 1, emergency responders 66 and cellular telephone/vehicle owners 64 are provided with Internet access to web server 60 having associated storage 68. Cellular telephone/vehicle owners 64 may access one or more Web pages hosted at server 60 for defining the emergency information to be provided to emergency responders 56 and 66, and/or the manner in which that information is provided. For example, cellular telephone/vehicle owners 64 may specify their name, age (date of birth), address, blood type, medical allergies, medical conditions, physician, emergency contact persons, etc. Cellular telephone/vehicle owners 64 may specify which of this information is disclosed to emergency responders 56 and/or 66 in the event of an emergency. The emergency information may be uploaded to cellular telephone storage 51 via cellular link 48, and/or to in-vehicle storage 22 for reporting via voice synthesizer 28 to emergency responders 56 and other contacts 58 in the event of an emergency.

The emergency information may also be stored in a database 68 associated with web server 68 for Internet access by emergency responders 66 in the event of an emergency. In one embodiment, speech transmission to emergency responders 56 includes instructions for accessing occupant emergency information at server 60 over the Internet 62. In this manner, emergency responders 56 and/or 66 can readily access all of an occupant's emergency information.

While the best mode for carrying out the invention has been described in detail, those familiar with the art to which this invention relates will recognize various alternative designs and embodiments for practicing the invention as defined by the following claims.

What is claimed:

1. A method for notifying an emergency responder of a vehicle emergency, the method comprising:
  establishing a first wireless communication link between a vehicle computing system and a first cellular telephone;
  monitoring a wireless connection status between the vehicle computing system and the first cellular telephone for loss of the first wireless communication link between the vehicle computing system and the first cellular telephone and generating an indication to a vehicle occupant if the wireless connection is lost, wherein if the connection is lost, a second wireless communication link is automatically established between the vehicle computing system and a second cellular telephone within the vehicle;
  monitoring for receipt of a vehicle-generated emergency signal indicating an emergency condition associated with the vehicle; and
  if an emergency signal is received:
    (a) retrieving a location for the vehicle from a global positioning system;
    (b) indicating to the occupant of the vehicle that a cellular telephone call to an emergency responder is going to be made to report the emergency and vehicle location;
    (c) monitoring an input device to determine whether the occupant has cancelled the emergency call;
    (d) if the occupant has not canceled the emergency call, activating the cellular telephone to dial a telephone number of an emergency responder;
    (e) processing data representing the emergency and location of the vehicle into speech signals; and
    (f) communicating the speech signals to the emergency responder over the first wireless communication link.

2. The method of claim 1 additionally comprising:
  storing a plurality of occupant or vehicle information in a data storage device;
  presenting the emergency responder with voice menu options for selecting one or more items of the plurality of occupant or vehicle information;
  processing the selected items into speech signals; and
  communicating the speech signals to the emergency responder over the first wireless communication link.

3. The method of claim 2 wherein one or more items of occupant or vehicle information are:

(a) communicated to a Web browser;
(b) communicated from the Web browser to a Web server over the Internet;
(c) communicated from the Web server to the cellular telephone;
(d) communicated from the cellular telephone to a data processor within the vehicle; and
(e) stored within the data storage device.

4. The method of claim 2 wherein one or more items of occupant or vehicle information are downloaded to the data storage device.

5. The method of claim 2 wherein the data storage device includes removable memory.

6. The method of claim 2 wherein the selection is performed using telephone touch tones.

7. The method of claim 1 additionally comprising:
activating the cellular telephone to dial a telephone number of a predefined contact other than an emergency responder; and
communicating the speech signals to the predefined emergency contact.

8. The method of claim 1 wherein the wireless communication link is a BLUETOOTH link.

9. The method of claim 1, wherein the indicating includes providing the occupant of the vehicle with an option to cancel the cellular telephone call.

10. An apparatus for notifying an emergency responder of a vehicle emergency, the apparatus comprising a data processor in communication with:
(a) a global positioning system for providing electrical signals to the data processor data representing a location for a vehicle;
(b) an emergency sensor for automatically detecting a vehicle emergency, and providing electrical signals to the data processor indicating an emergency state;
(c) a voice synthesizer for converting electrical signals representing the vehicle location and an emergency call notification into speech signals;
(d) a speaker for audibly relaying the emergency call notification to the vehicle occupant;
(e) an input device monitoring for a cancellation by the occupant of the emergency call in response to the emergency call notification; and
(f) a communication module for establishing a first wireless communication link between a vehicle computing system and a first cellular telephone within the vehicle and, if emergency call is not cancelled by the occupant, initiating a call at the cellular telephone to an emergency responder and communicating speech signals representing the vehicle location to the cellular telephone for telephone communication to an emergency responder, wherein the communication module is configured to monitor a wireless connection status between the vehicle computing system and the first cellular telephone, and generate an indication to the vehicle occupant if the wireless connection between the vehicle computing system and the first cellular telephone is lost, wherein the communication module is configured to automatically establish a second wireless communication link between the vehicle computing system and a second cellular telephone if the first wireless communication link with the first cellular telephone is lost.

11. The apparatus of claim 10 additionally comprising a data storage device in communication with the data processor for storing a plurality of occupant or vehicle information, wherein one or more items of the plurality of occupant or vehicle information are processed into speech signals at the voice synthesizer for communication to the emergency responder.

12. The apparatus of claim 11 wherein the communication module is configured to provide a voice menu categorizing the plurality of occupant or vehicle information, and receive one or more touch-tone signals to select which items are provided.

13. The apparatus of claim 10 wherein the communication module is configured to dial a telephone number of a predefined contact other than an emergency responder and communicate voice signals to the predefined emergency contact.

14. The apparatus of claim 10 wherein the communication module is a BLUETOOTH controller.

15. The method of claim 9, wherein the providing the occupant with an option to cancel includes providing a verbal indication that the call can be cancelled if desired.

* * * * *

UNITED STATES PATENT AND TRADEMARK OFFICE
CERTIFICATE OF CORRECTION

PATENT NO. : 9,848,447 B2  
APPLICATION NO. : 11/769346  
DATED : December 19, 2017  
INVENTOR(S) : Joseph J. Berry et al.

Page 1 of 1

It is certified that error appears in the above-identified patent and that said Letters Patent is hereby corrected as shown below:

On the Title Page

"(73) Assignee: Ford Global Technologies, LLC, Dearborn, MI (US)"  
Should read:  
"(73) Assignee: Ford Motor Company, Dearborn, MI (US)"

Signed and Sealed this  
Twenty-seventh Day of November, 2018

Andrei Iancu  
*Director of the United States Patent and Trademark Office*